United States Patent
Büyükyildiz et al.

(10) Patent No.: US 11,948,407 B2
(45) Date of Patent: Apr. 2, 2024

(54) METHOD FOR ADAPTING A DRIVING BEHAVIOR OF A MOTOR VEHICLE

(71) Applicant: Dr. Ing. h.c. F. Porsche Aktiengesellschaft, Stuttgart (DE)

(72) Inventors: Görkem Büyükyildiz, Gerlingen (DE); Eric Wahl, Wiernsheim (DE); Daniel Slieter, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 213 days.

(21) Appl. No.: 17/336,186

(22) Filed: Jun. 1, 2021

(65) Prior Publication Data
US 2021/0383621 A1    Dec. 9, 2021

(30) Foreign Application Priority Data

Jun. 8, 2020 (DE) ...................... 10 2020 115 149.7

(51) Int. Cl.
*G07C 5/04* (2006.01)
*B60W 40/09* (2012.01)
*B60W 50/00* (2006.01)

(52) U.S. Cl.
CPC .............. *G07C 5/04* (2013.01); *B60W 40/09* (2013.01); *B60W 50/0097* (2013.01);
(Continued)

(58) Field of Classification Search
CPC ..... G07C 5/04; B60W 40/09; B60W 50/0097; B60W 2556/45; B60W 2555/20; B60W 2555/60
See application file for complete search history.

(56) References Cited

U.S. PATENT DOCUMENTS

| 7,061,373 B2 * | 6/2006 | Takahashi ............. G08G 1/167 340/436 |
| 2005/0012604 A1 * | 1/2005 | Takahashi ............. G08G 1/166 340/435 |

(Continued)

FOREIGN PATENT DOCUMENTS

| DE | 199 63 224 | 6/2001 |
| GB | 2 571 590 | 9/2019 |

OTHER PUBLICATIONS

German Search Report dated Mar. 1, 2021.

*Primary Examiner* — Tarek Elarabi
(74) *Attorney, Agent, or Firm* — Gerald E. Hespos; Michael J Porco

(57) ABSTRACT

A method for adapting driving behavior includes inspecting driving behavior of a motor vehicle (1) travelling consecutively with a road user (2). Consecutive travel is detected by at least one sensor of the motor vehicle (1). If the other road user (2) is not detected, the method uses traffic data to predict a position of the other road user (2). If the predicted position of the road user (2) reveals consecutive travel, the method inspects the driving behavior of the motor vehicle (1) as in the case of consecutive travel detected by the at least one sensor. The method adapts a driving behavior while using few sensors to provide a high level of road safety and/or a high level of driving comfort. Optionally, a human-machine interface may display or report back a virtual representation of the road user in the predicted position to the driver of the motor vehicle.

12 Claims, 1 Drawing Sheet

(52) U.S. Cl.
CPC ..... *B60W 2555/20* (2020.02); *B60W 2555/60* (2020.02); *B60W 2556/45* (2020.02)

(56) References Cited

U.S. PATENT DOCUMENTS

| | | | |
|---|---|---|---|
| 2017/0101092 A1* | 4/2017 | Nguyen Van | G01S 7/40 |
| 2017/0213457 A1* | 7/2017 | Sato | G08G 1/096725 |
| 2017/0240176 A1* | 8/2017 | Aoki | B60W 50/082 |
| 2020/0051435 A1* | 2/2020 | Hashimoto | G06T 11/001 |
| 2020/0204269 A1* | 6/2020 | Yanagida | H04B 10/1123 |
| 2020/0342760 A1* | 10/2020 | Vassilovski | H04W 4/06 |
| 2021/0001850 A1* | 1/2021 | Shamshiri | B60W 30/16 |

* cited by examiner

METHOD FOR ADAPTING A DRIVING BEHAVIOR OF A MOTOR VEHICLE

CROSS REFERENCE TO RELATED APPLICATION

This application claims priority under 35 USC 119 to German Patent Appl. No. 10 2020 115 149.7 filed on Jun. 8, 2020, the entire disclosure of which is incorporated herein by reference.

BACKGROUND

Field of the Invention

The invention relates to a method for adapting a driving behavior of a motor vehicle, a motor vehicle having an onboard computer for performing such a method, a computer program and a computer program product for performing the method for adapting a driving behavior of a motor vehicle.

Related Art

Road users, such as motor vehicles, are usually the greatest sources of danger for other road users. Common causes of accidents are tailgating and overtaking maneuvers. Known methods use computer-aided intervention to affect speed and/or the steering behavior of the vehicle, or to provide feedback to which the vehicle driver can react in an appropriate way. Such computer aided methods often are referred to driver assistance or highly automated driving. For example, it is known to set a predetermined distance between road users travelling consecutively and to align the speeds with one another. This is also a necessary condition for fully autonomous driving of a motor vehicle where there is no human vehicle driver. To deal appropriately with all possibilities for fluently merging states, such as the relative positions of the road users travelling consecutively, there is a need for enormous outlay in terms of sensors and the required data to be ascertained. This is unsatisfactory both for the costs of the motor vehicle and for the outlay in terms of measurement technology.

Against this background, the present invention is based on the object of overcoming at least some of the disadvantages known from the prior art. The features according to the invention are obtained from the independent claims, for which advantageous configurations are shown in the dependent claims. The features of the claims can be combined in any technically meaningful manner, for which purpose it is also possible to consult the explanations from the description below and features from the figures, which comprise additional configurations of the invention.

SUMMARY

The invention relates to a method for adapting a driving behavior of a motor vehicle, comprising at least the following steps:

A. Inspecting and/or assessing a driving behavior of a motor vehicle travelling consecutively with another road user. The consecutive travel may be detected by at least one sensor of the motor vehicle;

B. In the event of loss of detection of the other road user, the method may include checking traffic data as a basis for predicting a position of the road user;

C. If the predicted position of the other road user reveals consecutive travel, then the method may comprise inspecting the driving behavior of the motor vehicle as in the case of consecutive travel detected by the at least one sensor.

The text below refers to the cited axis of rotation when, without an explicitly different indication, the axial direction, radial direction or the circumferential direction and corresponding terms are used. Ordinal numbers used in the description above and below serve, unless explicitly indicated to the contrary, merely for clear distinguishability and do not convey an order or rank of the denoted components. An ordinal number greater than one does not necessarily require another such component to be present.

The driving behavior of the motor vehicle that is adapted here relates to longitudinal guidance and transverse guidance, namely the speed and/or the steering behavior of the motor vehicle. The method may be performed by a driver assistance system. The effect achieved by the method is that intervention errors and false interventions are reduced and accordingly these systems gain better acceptance by the driver or the occupants of the motor vehicle due to increased comfort and/or a feeling of safety. In one embodiment, the method actively affects the driving behavior. In another embodiment, the method merely provides feedback to a vehicle driver and advises the vehicle driver to change his driving behavior. In one embodiment, the method for adapting the driving behavior is staggered in that the vehicle driver is advised to adapt his driving behavior in a less critical situation, whereas control of the motor vehicle is taken from the vehicle driver in an immediate or sudden critical situation. The retention of control of the driving behavior of the motor vehicle could be made more difficult, for example, by a driver assistance system that must be switched off or that requires considerable pedal forces or steering forces to be overcome.

Step A of the method may include inspecting and/or assessing the driving behavior of the vehicle travelling consecutively with another road user. The other road user may be another motor vehicle or a bicycle. The motor vehicle on which the method for adapting a driving behavior is performed is referred to herein as the performing motor vehicle. Consecutive travel defines a situation where the performing motor vehicle is behind the other road user and where the speed of the performing motor vehicle would be higher if this other road user were not travelling in front. Second, consecutive travel defines a situation where the distance from the other road user is shorter than is conducive to road safety and/or a comfortable driving behavior and includes situations where the other road user is travelling in front of the performing motor vehicle or behind the performing motor vehicle. A distance that promotes road safety and/or comfort may be dependent on the type of route, such as the condition of the ground and/or the curves. Inspecting the driving behavior of the performing motor vehicle does not necessarily mean that a driver assistance system has taken control of the vehicle completely, but rather merely monitors the current road safety or the comfort state and if necessary provides feedback to the vehicle driver of the performing motor vehicle, or in a critical traffic situation takes control of the performing motor vehicle.

Consecutive travel may be detected by at least one sensor, such as a front radar, a front camera, a rear radar and/or a rear camera that may be similar to those used for parking assistance. An adaptation of the driving behavior for consecutive travel may be cancelled if a loss of detection of the other road user occurs in Step B, and hence the desired acceleration of the performing motor vehicle may permitted again. This method is correct when the other road user disappears from the consecutive travel, for example by accelerating or by leaving the shared route with the performing motor vehicle (for example turning off). However, situations also arise in which the loss of detection of the road user is based solely on the shortcomings of at least one sensor even though the consecutive travel continues to exist. For example the detection can be erroneous when cornering with a very large safety distance due to measurement errors, such as shadowing or other disturbing effects. In some embodiments, the method takes into consideration the vehicle's own driving state, such as driving dynamics. This affects for example the safe or advisable distance from the other road user, the possible errors of at least one sensor (for example intensified pitching at high speed of travel as a result of braking and/or uneven ground) and the particularly comfort-critical transverse acceleration. Tire pressure also may be taken into consideration.

Step B may comprise checking traffic data and taking the traffic data as a basis for predicting and virtually determining a position of the other road user. Traffic data may be the road profile, traffic light sequences and/or weather data relating to the at least one sensor, such as fog, heavy rain or leaf fall. Data that are relevant to driving dynamics may be the yaw rate and the position of the road user in relation to the other motor vehicle travelling consecutively also may be taken into consideration or taken as a basis for the calculation.

If step C reveals that the predicted position of the road user continues to correspond to consecutive travel, the driving behavior continues to be inspected so that the performing motor vehicle is guided in a manner promoting road safety and/or comfortably, or the vehicle driver is prompted to adapt his driving behavior for driving that promotes road safety and/or is comfortable.

Step C may be restricted to a time range of less than one second, preferably to less than half of one second. Restricting a time to range to less than one second or less than half of one second assumes that the other road user is actually no longer travelling consecutively in the event of longer loss of detection. Additionally, the period of time below one second (or below half of one second) makes it less likely that the patience (acceptance) of a vehicle driver will be overtaxed by an erroneous recommendation or intervention when the other road user is actually no longer travelling consecutively.

A human-machine interface may be used to indicate to an occupant of the motor vehicle when the inspection of the driving behavior of the motor vehicle is based on a predicted position of the other road user. For example, a human-machine interface may display or report back a virtual representation of the other road user (travelling consecutively) in the predicted position to the driver of the motor vehicle.

The human-machine interface may be a screen or a projection that outputs a visually perceptible message to an occupant or driver of the performing motor vehicle as part of Step C. In one embodiment, the indication of the performance of Step C may be an applicable warning lamp. In another embodiment, or additionally, a virtual rear view is displayed to the occupant in his display, for example on an overhead display (in the windshield, or in the field of vision through the windshield to the front).

One embodiment of the method may be used if the other road user follows the motor vehicle in the direction of travel and performs an overtaking maneuver. This aspect of the method may comprise using the at least one sensor of the motor vehicle and/or traffic data for detecting the start of the overtaking maneuver. The actual overtaking maneuver may take place outside the detectable range of the at least one sensor Thus, the method comprises using traffic data as a predicted position of the other road user and inspecting the driving behavior of the motor vehicle according to the predicted position of the road user.

The other road user may be in the course of overtaking the performing motor vehicle where a large part of this overtaking maneuver is not (directly) relevant to the road safety or the comfort of the performing motor vehicle itself and is not detectable by standard front sensors and/or rear sensors. However, in this situation, the overtaking road user's pulling back in is dangerous for the performing motor vehicle or other road users, particularly if the performing motor vehicle itself is or was in turn travelling consecutively.

Accordingly, the method may comprise using the at least one sensor of the performing motor vehicle for detecting the start of the overtaking maneuver and then ascertaining a predicted position of the overtaking road user. On the basis of this predicted position of the overtaking road user, the driving behavior of the currently overtaken (performing) motor vehicle is inspected, for example an increase in the speed or a steering movement toward the overtaking road user is prevented, or an appropriate recommendation is output to the vehicle driver. By way of example, if the performing motor vehicle is travelling consecutively with a road user travelling ahead and is at a safety distance from the road user that does not permit the overtaking road user to pull into this gap, at least in a manner promoting road safety and/or comfortably, a sudden reduction in speed or even an evasive maneuver (steering behavior) is performed or recommended. By way of example, this is performed or recommended generally or on the basis of traffic data (for example country road) to reduce the time of potential self-endangerment of the road user that is overtaking and in the oncoming lane on a country road.

The start of the overtaking maneuver may be detected by a rear radar of the performing motor vehicle ascertaining a lateral exit from the radar range by the overtaking road user and/or detecting a decrease in the distance from the overtaking motor vehicle. In an alternative embodiment, the present position of the motor vehicle is known digitally in a cloud system by virtue of the overtaking road user transmitting its present position data and providing them to other road users, at least to the overtaken (performing) motor vehicle. The trajectory ascertained therefrom for the overtaking road user is used to calculate the predicted position. In an embodiment with a display for at least one occupant of the performing motor vehicle via a human-machine interface, a virtual vehicle may be displayed beside a virtual representation of the performing motor vehicle in a relative position that corresponds to the predicted position of the road user.

In one embodiment of the method, the traffic data are ascertained, preferably in a manner specific to type, on the basis of stored maps, local speed regulations, weather data, route data of the road user and/or position-related driving behavior of road users that have travelled at this position beforehand.

Traffic data on the basis of stored maps may use digital map material with curve profiles, traffic lights, gradients, number of lanes on and type of the road and other data. For example, the stored data may include up-to-date data concerning volume of traffic and traffic light sequences. Local speed regulations may be taken from the traffic data, and/or from the map material and/or from the available road signs by means of appropriate capture systems of the performing motor vehicle. The traffic data also may comprise weather data, such as information about black ice, strong wind or other interference with driving physics, and/or weather data that interfere with the at least one sensor ascertaining data, for example fog, heavy rain or snowfall.

Traffic data also may comprise route data of the road user that is travelling consecutively (for example in an overtaking maneuver). Thus, the route data of the road user are comparable with the route data of the performing motor vehicle and hence it is possible to determine the probability of the road user still travelling consecutively despite loss of detection of the road user. Position-related driving behavior may be included in the traffic data on the basis of road users that have previously travelled at the present position of the performing motor vehicle, or the predicted position of the road user travelling consecutively relative thereto. Thus, it can be known or assumed with a certain probability that the present road user is behaving appropriately. If, for example on a (specific) protracted curve, it is known that road users that have travelled there have often braked sharply, the predicted position of the road user travelling ahead is ascertained according to this driving behavior. Preferably, the road users that have travelled previously are taken into consideration in a manner specific to type, for example the driving behavior of a (rather sedate) truck that has travelled there previously is not taken into consideration if the present road user is a high performance automobile. The method may utilize artificial intelligence, for example machine learning, preferably a deep learning algorithm, and/or artificial neural networks [ANN]. Thus, the selection of the data, the relevance of data and the type of processing of the data are learned in automated fashion. By way of example, marginal control excursions also are included that are ignored in a simple control loop on account of their lack of specificity, low amplitude or lack of knowledge about a relationship, but that statistically reliably lead to palpable events in a huge amount of data for identical or similar previously known (digitally available) events.

In one embodiment of the method the motor vehicle is configured to communicate with:
  a cloud system;
  a position detection system;
  the road user travelling consecutively; and/or
  other road users.

In one embodiment of the method, the performing motor vehicle is capable of communicating with different instances and of using the provided data of these instances to adapt the driving behavior of the performing motor vehicle. Such an instance is a cloud system in which a central server or a server system has plural communicatively interconnected server units that contain stored data. The performing motor vehicle can request and/or receive (at the request thereof or on the initiative of the cloud system) data that can be used for the method described here. Such data may include a present volume of traffic, information about an obstacle on the route ahead and/or weather data. A position detection system is for example GPS [Global Positioning System] or Galileo, by means of which the vehicle's own position is determinable and can be used in a digital map material (navigation system of the performing motor vehicle).

In an advantageous embodiment, the performing motor vehicle is capable of communicating with the road user travelling consecutively, as a result of which the relative position and trajectory are known to the performing motor vehicle or to the performing system, for example a driver assistance system. In another embodiment, the performing motor vehicle is configured to communicate with other road users, as a result of which for example a collective intelligence (also referred to as swarm intelligence) can be used to adapt the driving behavior of the performing motor vehicle.

The invention also relates to a motor vehicle comprising:
  at least one drive machine;
  at least one propulsion wheel;
  at least one sensor for detecting a road user; and
  at least one onboard computer that is communicatively connected to the at least one sensor and is configured to inspect the driving behavior of the motor vehicle. The onboard computer can be used to perform the above-described method.

The drive machine of the motor vehicle ma be an internal combustion engine and/or at least one electrical drive machine, and one or propulsion wheels that can be driven by at least one of the drive machines to bring about propulsion of the motor vehicle. The motor vehicle may be an automobile for transporting people (occupants) and may be the performing motor vehicle described above.

The at least one sensor may be a front radar, front camera, rear radar and/or rear camera configured to detect a road user. An onboard computer of the performing motor vehicle is capable of processing the data of the at least one sensor such that all or some of the method described above can be performed by the onboard computer. The onboard computer is capable of inspecting the driving behavior of the performing motor vehicle, intervening in the driving behavior of the performing motor vehicle and/or outputting recommendations to a vehicle driver so that the driver can adapt the driving behavior as appropriate. The onboard computer is connected communicatively to sensors for example via a bus system (for example CAN, CAN FD® or FlexRay®) and/or comprises subunits or subnodes. The onboard computer may be connected communicatively to at least one human-machine interface. Performance of the method described here requires barely any or no adaptation at physical level, and there is preferably only provision for an additional human-machine interface.

The motor vehicle also may have a wireless transceiver by means of which the onboard computer is connected communicatively to:
  a cloud system;
  a position detection system;
  the road user travelling consecutively; and/or
  other road users.

The motor vehicle also may have a transceiver, that is to say a device configured to send and to receive (preferably digital) data. The onboard computer is connected communicatively to this transceiver so that the onboard computer can receive data from outside the performing motor vehicle. Examples of external data of this kind are described above. In one embodiment, the onboard computer does not perform the method completely independently, but rather forwards raw data or conditioned data to at least one other computer, for example in a cloud system, and receives back conditioned data or finished results. These data or results enable the onboard computer to inspect the driving behavior of the performing motor vehicle.

The terms cloud system, computer, server or server units are used here synonymously with the devices known from the prior art. A computer accordingly comprises one or more general-purpose processors (CPUs) or microprocessors, RISC processors, GPUs and/or DSPs. The computer has for example additional elements such as storage interfaces of the communication interfaces. Optionally or additionally, the terms refer to a device that is capable of executing a provided or included program, preferably with standardized programming language (for example C++, JavaScript or Python), and/or of controlling and/or accessing data storage devices and/or other devices such as input interfaces and output interfaces. The term computer also refers to a multiplicity of processors or a multiplicity of (sub)computers that are interconnected and/or connected and/or otherwise communicatively connected and possibly share one or more other resources, such as for example a memory.

A (data) memory is for example a hard disk (HDD) or a (nonvolatile) solid state memory, for example a ROM store or flash memory [flash EEPROM]. The memory often comprises a plurality of individual physical units or is distributed over a multiplicity of separate devices, as a result of which access thereto takes place via data communication, for example package data service. The latter is a decentralized solution, wherein memory and processors of a multiplicity of separate computers, for example the onboard computers of participating motor vehicles, are used instead of a (single) central server or in addition to a central server.

The data transmission by means of the transceiver having at least one antenna for sending and receiving preferably takes place using the conventional mobile radio connection frequencies and formats, such as for example GSM (Global System for Mobile Communications), 3G, 4G or 5G, CDMA (Code Division Multiple Access), CDMA, UMTS (Universal Mobile Telecommunications System) or LTE (Long Term Evolution). Alternatively or additionally, the communication, for example using a handheld (for example a smartphone), is performable wirelessly via WLAN (for example according to one of the IEEE 802.11x standards), via WPAN (for example according to one of the IEEE 802.15.i standards), or else by infrared or (in wired fashion) by cable.

For the purpose of adapting and conditioning data, for example for one of the above transmission algorithms and/or for the programming language of the requesting user terminal, and conditioning them into data packets, for example as Internet Protocol datagram for the TCP/IP protocol, and/or compressing data, there is provision for a communication interface that thus conditions the data for transmission by means of the transceiver or for processing received data, preferably as machine code or machine-readable command forms of comparable program layers.

The invention also relates to a computer program comprising computer program code that is executable on at least one computer such that the at least one computer is prompted to perform aspects of the above-described method. The computer may be integrated in a motor vehicle; and/or may be configured to communicate with an onboard computer of a motor vehicle. The motor vehicle may be embodied as described above.

The method described here is embodied in computer-implemented fashion according to this embodiment. The computer-implemented method is stored as computer program code, wherein the computer program code, when executed on a computer, prompts the computer to perform the method according to an embodiment described above.

The computer-implemented method is realized by a computer program that comprises computer program code, wherein the computer program code, when executed on a computer, prompts the computer to perform the method according to an embodiment according to the preceding description. Computer program code refers synonymously to one or more instructions or commands that prompt a computer or processor to perform a series of operations that represent an algorithm and/or other processing methods, for example.

Preferably some or all of the computer program is executable on a server or a server unit of a cloud system, a handheld (for example a smartphone) and/or on an onboard computer of a or the performing motor vehicle. The term server or server unit is used here to refer to a computer that provides data and/or operative services or services for one or more other computer-aided devices or computers and thus forms the cloud system.

According to another aspect, a computer program product is proposed on which the computer program code is stored. The computer program code is executable on at least one computer such that the at least one computer is prompted to perform the method according to an embodiment described above. At least one of the computers is integrated in a motor vehicle; and/or is configured to communicate with an onboard computer of a motor vehicle, such as the motor vehicle described above.

As computer program product, comprising a computer program code, is for example a medium such as for example RAM, ROM, an SD card, a memory card, a flash memory card or a disc, or stored on a server and downloadable. As soon as the computer program is rendered readable by a reading unit, for example a drive and/or an installation, the containing computer program code and the method contained therein are executable by a computer or in communication with a plurality of server units, for example according to the description above.

The invention described above is explained in detail below against the relevant technical background with reference to the associated drawings, which show preferred configurations. The invention is in no way restricted by the purely schematic drawings, and it should be noted that the drawings are not to scale and are not suitable for defining size ratios.

DETAILED DESCRIPTION

Figure 1:
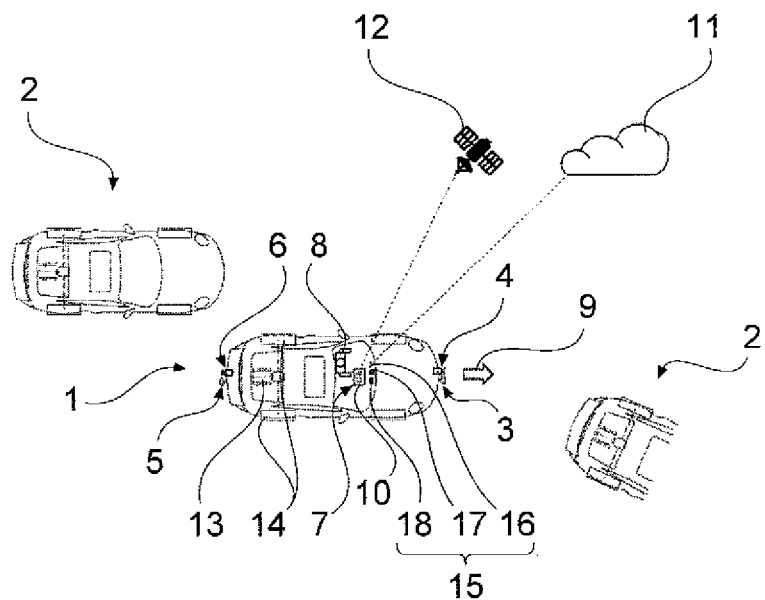
FIG. 1 depicts a motor vehicle with two road users.

FIG. 1 depicts, purely schematically and in simplified form, a plan view of a (performing) motor vehicle 1 with two road users 2. The performing motor vehicle 1 is being overtaken by the rear road user 2 (travelling consecutively), this rear road user 2 big situated outside the capture range of the rear sensors 5,6 of the performing motor vehicle 1 and possibly in a blind spot for the occupant 8 of the performing motor vehicle 1. Depicted travelling in front of the performing motor vehicle 1 is a front road user 2, which, owing to cornering, is disappearing from the capture range of the front sensors 3,4 of the performing motor vehicle 1. The performing motor vehicle 1 has a drive machine 13 and propulsion wheels 14 driven thereby. The drive machine 13 and the propulsion wheels 14 are controllable solely by the occupant 8 or additionally by a driver assistance system, and the direction of travel 9 of the performing motor vehicle 1 is adaptable by the occupant 8 and a driver assistance system. The performing motor vehicle 1 in the embodiment shown has a rear radar 5 and a rear camera 6 at the rear of the performing motor vehicle 1 that can capture a following road user 2 (here likewise a motor vehicle) travelling consecutively, and an overtaking road user's 2 pulling out is capturable. The front of the performing motor vehicle 1 has a front radar 3 and a front camera 4, by means of which a road user 2 travelling in front is capturable travelling consecutively. An onboard computer 15 of the performing motor vehicle 1 comprises a processor 17 and a memory 18 for processing data of the sensors, and, in this embodiment, data received from a cloud system 11 via the transceiver 16. Furthermore, the performing motor vehicle 1 has a human-machine interface 7 (for example a screen), on which (for the sake of simplicity) route data 10 are symbolically depicted that are preferably processed by the onboard computer 15. Furthermore (for the sake of simplicity), it is symbolically depicted that a position detection system 12 (depicted here as a satellite) is directly in data-transmitting contact with the human-machine interface 7, this preferably being accomplished via an antenna (not depicted).

Figure 2:
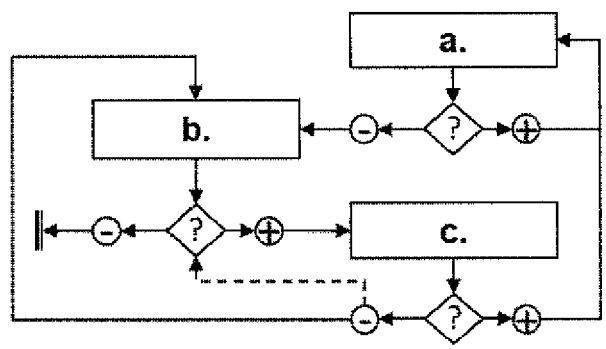
FIG. 2 depicts a flowchart for a method for adapting the driving behavior.

FIG. 2 depicts a flowchart for the method for adapting a driving behavior of a performing motor vehicle 1 by way of illustration. In a step A, the driving behavior of the performing motor vehicle 1 travelling consecutively is inspected or assessed, for example as is already sufficiently well known. Reference is made to FIG. 1 where the corresponding features and reference signs are mentioned. If a loss of detection of the road user 2 occurs, which calls for inspection or assessment of the driving behavior of the performing motor vehicle 1 travelling consecutively, (depicted by a minus sign here), then step B. is performed, that is to say that traffic data are checked and a predicted position of the road user 2 is determined. If this predicted position in turn reveals consecutive travel (depicted by a plus sign here), then step C. is performed, which essentially corresponds to step A, for example, but in this instance is based not on the data of the at least one sensor 3, 4, 5, 6 of the performing motor vehicle 1 but rather on the predicted position ascertained in step B. Here too, the at least one sensor 3, 4, 5, 6 preferably continues to inspect whether consecutive travel is still revealed, and if this is the case (depicted by a plus sign here) then step A is performed. If it happens that no road user 2 can be determined by the sensors, then step B is repeated (for example within a predetermined set time frame, for example of below one second). If it happens that the ascertained predicted position no longer reveals consecutive travel (depicted by a minus sign here) then the method for adapting the driving behavior of the performing motor vehicle 1 is ended. If, however, consecutive travel is revealed by the predicted position then step C is repeated or continues to be performed. In an advantageous embodiment, a next check results in step B not being repeated after a time frame (of for example below one second) has elapsed, but rather the method for adapting the driving behavior of the performing motor vehicle 1 being ended (depicted by a dashed arrow here). It should be pointed out that the steps and the check on the position of the road user 2 travelling consecutively take place at overlapping times. For example step C seamlessly follows step A.

The method for adapting a driving behavior of a motor vehicle proposed here permits a few sensors to be used to provide a high level of road safety and/or a high level of driving comfort. Optionally, a human-machine interface is used to display or report back a virtual representation of the road user in the predicted position to the driver of the motor vehicle.

LIST OF REFERENCE SIGNS 1 (performing) motor vehicle
2 road user
3 front radar
4 front camera
5 rear radar
6 rear camera
7 human-machine interface
8 occupant
9 direction of travel
10 route data
11 cloud system
12 position detection system
13 drive machine
14 propulsion wheel
15 onboard computer
16 transceiver
17 processor
18 memory

What is claimed is:

1. A method for adapting a driving behavior of a motor vehicle, comprising at least the following steps:
   a. inspecting a driving behavior of a motor vehicle travelling consecutively with a road user in a direction of travel, wherein the consecutive travel is detected by at least one sensor of the motor vehicle;
   b. in the event of loss of detection of the road user by the at least one sensor, checking position-related traffic data related to a present position of the motor vehicle for predicting a position of the road user;
   c. if the predicted position of the road user reveals consecutive travel, inspecting the driving behavior of the motor vehicle as in the case of consecutive travel detected by means of the at least one sensor;
   d. ascertaining the position-related traffic data of the motor vehicle in a manner specific to type, on a basis of stored maps, local speed regulations, weather data, route data of the road user and position related driving behavior of road users that have traveled at this position beforehand; and
   e. intervening in the driving behavior of the motor vehicle and outputting recommendations to a driver of the motor vehicle such that the driver adapts the driving behavior based on the detected consecutive travel and the position-related traffic data ascertained in step d, wherein when the road user follows the motor vehicle in the direction of travel and performs an overtaking maneuver, the intervening in the driving behavior of the motor vehicle comprises causing the motor vehicle to perform at least one of a sudden reduction in speed and an evasive steering maneuver if required to ensure that the road user has sufficient space to pull into a gap between the motor vehicle and a preceding motor vehicle.

2. The method of claim 1, wherein the performance of step c. is restricted to a time frame of less than one second.

3. The method as claimed in claim 1, further comprising using a human-machine interface to indicate to an occupant of the motor vehicle when the inspection of the driving behavior of the motor vehicle is based on the predicted position of the road user.

4. The method as claimed in claim 3, further comprising using the human-machine interface to display to the occupant of the motor vehicle the predicted position of the road user.

5. The method of claim 1, wherein the motor vehicle is configured to communicate with:
   a cloud system to request and receive at least the position-related traffic data;
   a position detection system to determine the present position of the motor vehicle on a route;

the road user travelling consecutively; and/or other road users.

6. A motor vehicle, comprising:

at least one drive machine;

at least one propulsion wheel;

at least one sensor for detecting a road user; and at least one onboard computer that is communicatively connected to the at least one sensor and is configured to inspect a driving behavior of the motor vehicle, wherein the onboard computer is configured to perform the method of claim 1.

7. The motor vehicle of claim 6, further comprising a wireless transceiver by means of which the onboard computer is communicatively connectable to:

a cloud system to request and receive at least the position-related traffic data;

a position detection system to determine the present position of the motor vehicle on a route;

the road user travelling consecutively; and/or other road users.

8. A non-transitory computer readable medium comprising a computer program comprising computer program code, wherein the computer program code is executable on at least one computer such that the at least one computer performs the method of claim 1, wherein the at least one computer is integrated in a motor vehicle.

9. A non-transitory computer readable medium comprising a computer program product on which computer program code is stored, wherein the computer program code is executable on at least one computer such that the at least one computer performs the method of claim 1.

10. The method of claim 1, wherein the position-related data of the present position of the motor vehicle includes curve profiles, traffic lights, gradients, number of lanes on and type of a road.

11. A method of for adapting a driving behavior of a motor vehicle, comprising:

a. inspecting a driving behavior of a motor vehicle travelling consecutively with a road user in a direction of travel, wherein the consecutive travel is detected by at least one sensor of the motor vehicle;

b. in the event of loss of detection of the road user by the at least one sensor, checking position-related traffic data related to a present position of the motor vehicle for predicting a position of the road user;

c. if the predicted position of the road user reveals consecutive travel, inspecting the driving behavior of the motor vehicle as in the case of consecutive travel detected by means of the at least one sensor;

d. ascertaining the position-related traffic data of the present position of the motor vehicle in a manner specific to type, on a basis of stored maps, local speed regulations, weather data, route data of the road user and position related driving behavior of road users that have traveled at this position beforehand; and e. intervening in the driving behavior of the motor vehicle and outputting recommendations to a driver of the motor vehicle such that the driver adapts the driving behavior based on the position-related traffic data ascertained in step d.

12. The method of claim 11, wherein when the road user follows the motor vehicle in the direction of travel and performs an overtaking maneuver, the method further comprises using the at least one sensor of the motor vehicle and/or by traffic data for detecting a start of the overtaking maneuver, and if part of the overtaking maneuver takes place outside a detectable range of the at least one sensor, then ascertaining a present position of the road user by the position-related traffic data of the motor vehicle as a predicted position of the road user and inspecting the driving behavior of the motor vehicle according to the predicted position of the road user, and the intervening in the driving behavior of the motor vehicle comprises causing the motor vehicle to perform at least one of a sudden reduction in speed and an evasive steering maneuver if required to ensure that the road user has sufficient space to pull into a gap between the motor vehicle and a preceding motor vehicle.

* * * * *